(12) United States Patent
Buttler

(10) Patent No.: US 12,455,220 B2
(45) Date of Patent: Oct. 28, 2025

(54) DETECTING AN ORIENTATION OF A VIBRATORY METER AND COMPENSATING A MEASUREMENT BASED ON THE DETECTED ORIENTATION

(71) Applicant: MICRO MOTION, INC., Boulder, CO (US)

(72) Inventor: Marc Allan Buttler, Erie, CO (US)

(73) Assignee: MICRO MOTION, INC., Boulder, CO (US)

( * ) Notice: Subject to any disclaimer, the term of this patent is extended or adjusted under 35 U.S.C. 154(b) by 420 days.

(21) Appl. No.: 17/775,038

(22) PCT Filed: Nov. 13, 2019

(86) PCT No.: PCT/US2019/061263
§ 371 (c)(1),
(2) Date: May 6, 2022

(87) PCT Pub. No.: WO2021/096501
PCT Pub. Date: May 20, 2021

(65) Prior Publication Data
US 2022/0390343 A1    Dec. 8, 2022

(51) Int. Cl.
*G01N 9/10* (2006.01)
*G01F 1/84* (2006.01)
*G01N 9/32* (2006.01)

(52) U.S. Cl.
CPC ............ *G01N 9/32* (2013.01); *G01F 1/8431* (2013.01); *G01F 1/8436* (2013.01); *G01F 1/8477* (2013.01)

(58) Field of Classification Search
CPC .............................. G01N 9/32; G01F 1/8477
See application file for complete search history.

(56) References Cited

U.S. PATENT DOCUMENTS

| | | | | |
|---|---|---|---|---|
| 4,729,243 | A | * | 3/1988 | Friedland .............. G01F 1/8472 73/861.355 |
| 4,934,196 | A | * | 6/1990 | Romano ............... G01F 1/8477 702/77 |
| 5,228,327 | A | | 7/1993 | Bruck |
| 6,338,199 | B1 | * | 1/2002 | Chigira ................. G01P 15/123 33/321 |
| 7,000,465 | B1 | | 2/2006 | L'Bassi et al. |
| 7,059,199 | B2 | | 6/2006 | Mattar et al. |

(Continued)

FOREIGN PATENT DOCUMENTS

| | | |
|---|---|---|
| CN | 1643346 A | 7/2005 |
| CN | 101346612 A | 1/2009 |

(Continued)

*Primary Examiner* — John E Breene
*Assistant Examiner* — Alex T Devito
(74) *Attorney, Agent, or Firm* — The Ollila Law Group LLC

(57) ABSTRACT

A meter electronics (20) for detecting an orientation and compensating a measurement based on the detected orientation is provided. The meter electronics (20) comprises an interface (401) configured to communicatively couple to a sensor assembly (10) and a processing system (402). The processing system (402) is configured to detect an orientation of the sensor assembly (10) based on one or more sensor signals provided by the sensor assembly (10).

21 Claims, 9 Drawing Sheets

(56) References Cited

U.S. PATENT DOCUMENTS

| | | |
|---|---|---|
| 7,308,368 B2 | 12/2007 | Kok et al. |
| 7,421,350 B2 | 9/2008 | Duffill et al. |
| 10,466,151 B2 | 11/2019 | Eckert et al. |
| 2005/0229691 A1* | 10/2005 | Shaw ................. B60C 23/0408 73/146 |
| 2007/0219650 A1 | 9/2007 | Wang et al. |
| 2017/0115142 A1 | 4/2017 | Weinstein |
| 2017/0356833 A1 | 12/2017 | Eckert et al. |
| 2020/0109979 A1 | 4/2020 | Dasaka |

FOREIGN PATENT DOCUMENTS

| | | | |
|---|---|---|---|
| DE | 102016114972 A1 * | 2/2018 | ............. G01N 9/002 |
| WO | 2019195292 A1 | 10/2019 | |

\* cited by examiner

DETECTING AN ORIENTATION OF A VIBRATORY METER AND COMPENSATING A MEASUREMENT BASED ON THE DETECTED ORIENTATION

TECHNICAL FIELD

The embodiments described below relate to a measurement by a vibratory meter and, more particularly, to detecting an orientation of the vibratory meter and compensating the measurement based on the detected orientation.

BACKGROUND

Vibratory meters, such as for example, Coriolis mass flowmeters, liquid density meters, gas density meters, liquid viscosity meters, gas/liquid specific gravity meters, gas/liquid relative density meters, and gas molecular weight meters, are generally known and are used for measuring characteristics of fluids. Generally, vibratory meters comprise a sensor assembly and a meter electronics. The material within the sensor assembly may be flowing or stationary. The vibratory meter may be used to measure a mass flow rate, density, or other properties of a material in the sensor assembly.

The vibratory meter may be oriented in different directions. For example, where the sensor assembly has two bent conduits containing the material, the bent conduits may have a tubes-up, tubes-down, or flag orientation. Additionally, the vibratory meter may be calibrated in an orientation and installed at a customer site in a different orientation. For example, the vibratory meter may be calibrated in a tubes-up orientation and installed in a customer site in a flag orientation.

However, due to the density of the material varying due to pressure (i.e., head pressure can cause density of the material to increase) and other effects on the vibration characteristics of vibratory meters (e.g., rotational elements of mode shapes) caused by the relative direction of gravitational forces, the orientation of the sensor assembly may affect a measurement of the vibratory meter. For example, a density measurement by a sensor assembly in a tubes-down orientation may be greater than a density measurement by the same sensor assembly in a tubes-up orientation. Accordingly, there is a need to detect the orientation of the vibratory meter and compensate the measurement of the vibratory meter based on the detected orientation.

SUMMARY

A meter electronics for detecting an orientation and compensating a measurement based on the detected orientation is provided. According to an embodiment, the meter electronics comprises an interface configured to communicatively couple to a sensor assembly and a processing system. The processing system is configured to detect an orientation of the sensor assembly based on one or more sensor signals provided by the sensor assembly.

A vibratory meter for detecting an orientation and compensating a measurement based on the detected orientation is provided. According to an embodiment, the vibratory meter comprises a sensor assembly and a meter electronics communicatively coupled to the sensor assembly. The meter electronics is configured to detect an orientation of the sensor assembly based on one or more sensor signals provided by the sensor assembly.

A method for detecting an orientation of a vibratory meter and compensating a measurement based on the detected orientation is provided. According to an embodiment the method comprises receiving one or more sensor signals from a sensor assembly and detecting an orientation of the sensor assembly based on the one or more sensor signals provided by the sensor assembly.

ASPECTS

According to an aspect, a meter electronics (20) for detecting an orientation and compensating a measurement based on the detected orientation comprises an interface (401) configured to communicatively couple to a sensor assembly (10), and a processing system (402) configured to detect an orientation of the sensor assembly (10) based on one or more sensor signals provided by the sensor assembly (10).

Preferably, the processing system (402) being configured to detect the orientation of the sensor assembly (10) based on the one or more sensor signals comprises the processing system (402) being configured to detect the orientation based on a time-period of one or more vibration modes of the sensor assembly (10) as observed in a sensor signal in the one or more sensor signals provided by the sensor assembly (10).

Preferably, the meter electronics (20) being configured to detect the orientation based on the time-period of one or more vibration modes comprises the meter electronics (20) being configured to detect the orientation based on density values determined from at least two of the one or more vibration modes.

Preferably, the processing system (402) is further configured to compensate a measurement based on the detected orientation of the sensor assembly (10).

Preferably, the processing system (402) being further configured to compensate the measurement based on the detected orientation of the sensor assembly (10) comprises the processing system (402) being further configured to compensate the measurement based on a relationship of the detected orientation of the sensor assembly (10) to a reference orientation of the sensor assembly (10).

Preferably, the reference orientation is a calibration orientation.

Preferably, the detected orientation of the sensor assembly (10) is one of a tubes-down orientation (500A), a tubes-up orientation (500B), and a flag orientation (500C).

According to an aspect, a vibratory meter (5) for detecting an orientation and compensating a measurement based on the detected orientation comprises a sensor assembly (10), and a meter electronics (20) communicatively coupled to the sensor assembly (10). The meter electronics (20) is configured to detect an orientation of the sensor assembly (10) based on one or more sensor signals provided by the sensor assembly (10).

Preferably, the meter electronics (20) being configured to detect the orientation of the sensor assembly (10) based on the one or more sensor signals comprises the meter electronics (20) being configured to detect the orientation based on a time-period of one or more vibration modes of the sensor assembly (10) as observed in a sensor signal in the one or more sensor signals provided by the sensor assembly (10).

Preferably, the meter electronics (20) being configured to detect the orientation based on the time-period of one or more vibration modes comprises the meter electronics (20)

being configured to detect the orientation based on density values determined from at least two of the one or more vibration modes.

Preferably, meter electronics (20) is further configured to compensate a measurement based on the detected orientation of the sensor assembly (10).

Preferably, the meter electronics (20) being further configured to compensate the measurement based on the detected orientation of the sensor assembly (10) comprises the meter electronics (20) being further configured to compensate the measurement based on a relationship of the detected orientation of the sensor assembly (10) to a reference orientation of the sensor assembly (10).

Preferably, the reference orientation is a calibration orientation.

Preferably, the detected orientation of the sensor assembly (10) is one of a tubes-down orientation (500A), a tubes-up orientation (500B), and a flag orientation (500C).

According to an aspect, a method for detecting an orientation of a vibratory meter and compensating a measurement based on the detected orientation comprises receiving one or more sensor signals from a sensor assembly, and detecting an orientation of the sensor assembly based on the one or more sensor signals provided by the sensor assembly.

Preferably, detecting the orientation of the sensor assembly based on the one or more sensor signals comprises detecting the orientation based on a time-period of one or more vibration modes of a sensor assembly as observed in a sensor signal in the one or more sensor signals provided by the sensor assembly.

Preferably, detecting the orientation based on the time-period of one or more vibration modes comprises detecting the orientation based on density values determined from at least two of the one or more vibration modes.

Preferably, the method further comprises compensating a measurement based on the detected orientation of the sensor assembly.

Preferably, compensating the measurement based on the detected orientation of the sensor assembly comprises compensating the measurement based on a relationship of the detected orientation of the sensor assembly to a reference orientation of the sensor assembly.

Preferably, the reference orientation is a calibration orientation.

Preferably, the detected orientation of the sensor assembly is one of a tubes-down orientation, a tubes-up orientation, and a flag orientation.

BRIEF DESCRIPTION OF THE DRAWINGS

The same reference number represents the same element on all drawings. It should be understood that the drawings are not necessarily to scale.

DETAILED DESCRIPTION

FIGS. 1-8 and the following description depict specific examples to teach those skilled in the art how to make and use the best mode of embodiments of detecting an orientation and correcting a measurement based on the detected orientation. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of detecting an orientation and correcting a measurement based on the orientation. As a result, the embodiments described below are not limited to the specific examples described below, but only by the claims and their equivalents.

Figure 1:
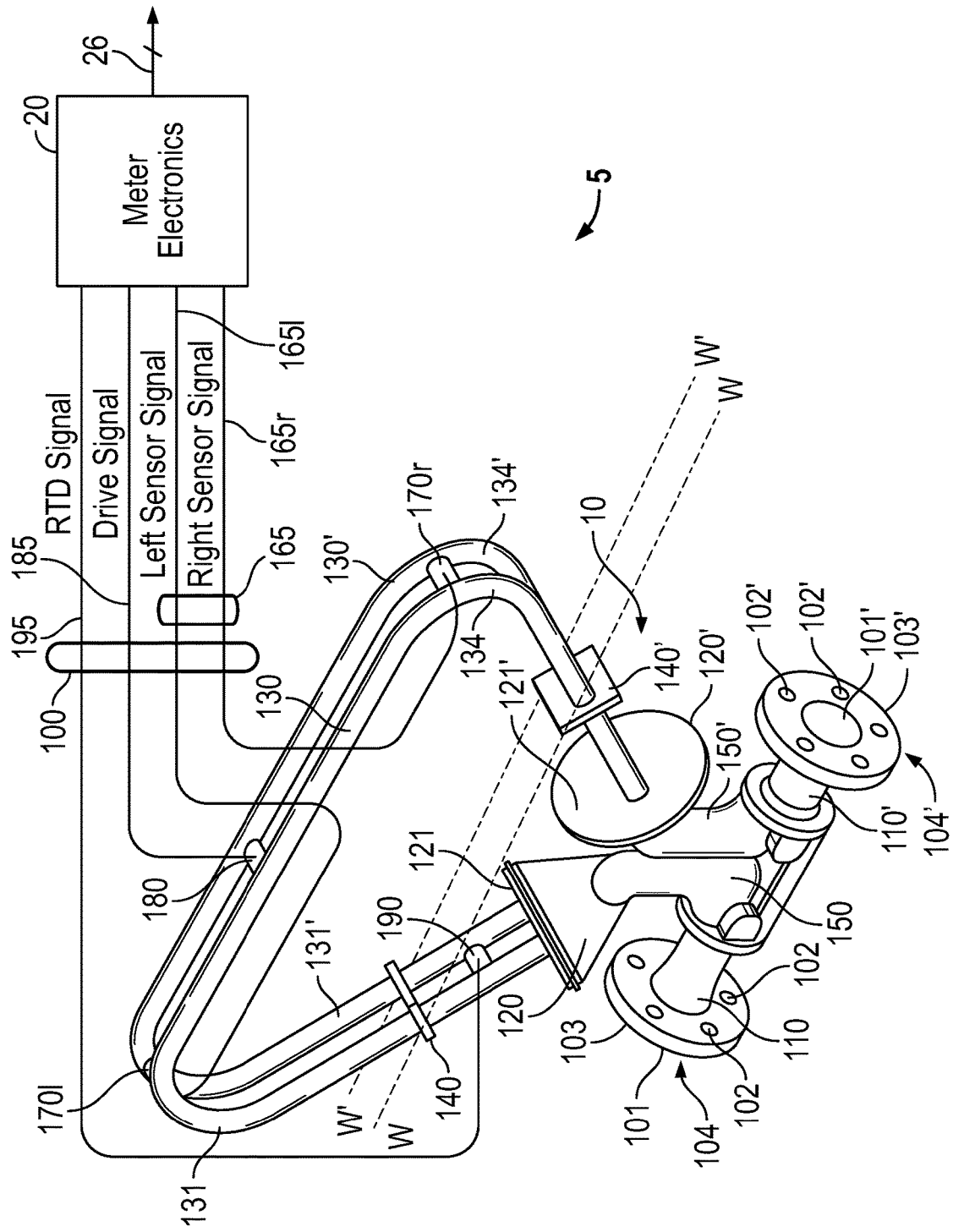
FIG. 1 shows a vibratory meter 5 for detecting an orientation and compensating a measurement based on the detected orientation.

FIG. 1 shows a vibratory meter 5 for detecting an orientation and compensating a measurement based on the detected orientation. As shown in FIG. 1, the vibratory meter 5 comprises a sensor assembly 10 and meter electronics 20. The sensor assembly 10 responds to mass flow rate and density of a process material. The meter electronics 20 is connected to the sensor assembly 10 via leads 100 to provide density, mass flow rate, and temperature information over port 26, as well as other information.

The sensor assembly 10 includes a pair of manifolds 150 and 150', flanges 103 and 103' having flange necks 110 and 110', a pair of parallel conduits 130 and 130', driver 180, resistive temperature detector (RTD) 190, and a pair of pick-off sensors 170*l* and 170*r*. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through sensor assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal 185 is applied by the meter electronics 20, via a lead, to the driver 180.

The meter electronics 20 receives the RTD temperature signal on lead 195, and sensor signals 165 appearing on leads 100 carrying left and right sensor signals 165l, 165r, respectively. The meter electronics 20 produces the drive signal 185 appearing on the lead to driver 180 and vibrate conduits 130, 130'. The meter electronics 20 processes the left and right sensor signals 165l, 165r and the RTD signal 195 to compute the mass flow rate and the density of the material passing through sensor assembly 10. This information, along with other information, is applied by meter electronics 20 over path 26 as a signal. A more detailed discussion of the meter electronics 20 follows.

Figure 2:
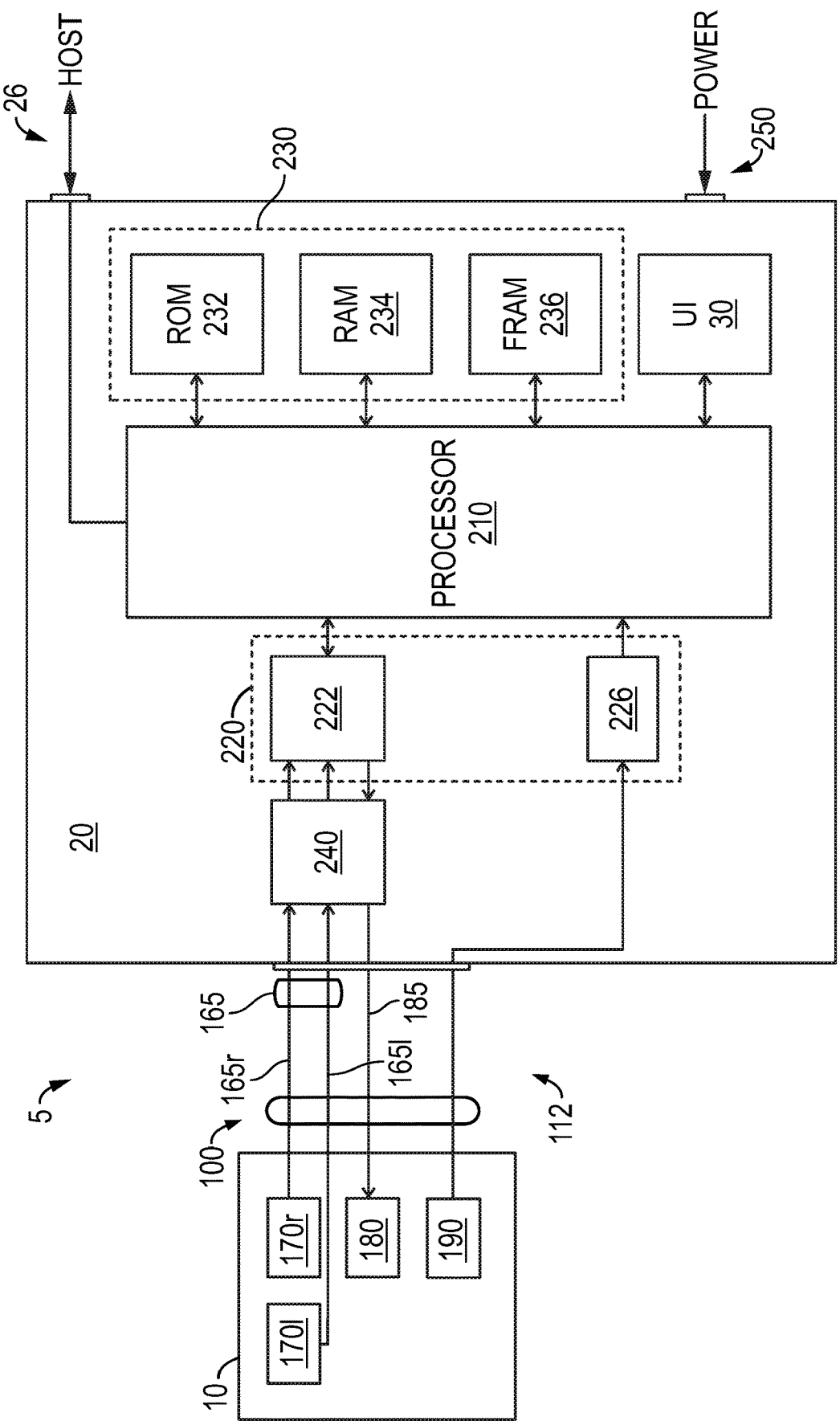
FIG. 2 shows a block diagram of the vibratory meter 5, including a block diagram representation of the meter electronics 20.

FIG. 2 shows a block diagram of the vibratory meter 5, including a block diagram representation of the meter electronics 20. As shown in FIG. 2, the meter electronics 20 is communicatively coupled to the sensor assembly 10. As described in the foregoing with reference to FIG. 1, the sensor assembly 10 includes the left and right pick-off sensors 170l, 170r, driver 180, and temperature sensor 190, which are communicatively coupled to the meter electronics 20 via the set of leads 100 through a communications channel 112.

The meter electronics 20 provides a drive signal 185 via the leads 100. More specifically, the meter electronics 20 provides a drive signal 185 to the driver 180 in the sensor assembly 10. In addition, sensor signals 165 comprising the left sensor signal 165l and the right sensor signal 165r are provided by the sensor assembly 10. More specifically, in the embodiment shown, the sensor signals 165 are provided by the left and right pick-off sensor 170l, 170r in the sensor assembly 10. As can be appreciated, the sensor signals 165 are respectively provided to the meter electronics 20 through the communications channel 112.

The meter electronics 20 includes a processor 210 communicatively coupled to one or more signal processors 220 and one or more memories 230. The processor 210 is also communicatively coupled to a user interface 30. The processor 210 is communicatively coupled with the host via a communication port over the port 26 and receives electrical power via an electrical power port 250. The processor 210 may be a microprocessor although any suitable processor may be employed. For example, the processor 210 may be comprised of sub-processors, such as a multi-core processor, serial communication ports, peripheral interfaces (e.g., serial peripheral interface), on-chip memory, I/O ports, and/or the like. In these and other embodiments, the processor 210 is configured to perform operations on received and processed signals, such as digitized signals.

The processor 210 may receive digitized sensor signals from the one or more signal processors 220. The processor 210 is also configured to provide information, such as a phase difference, a property of a fluid in the sensor assembly 10, or the like. The processor 210 may provide the information to the host through the communication port. The processor 210 may also be configured to communicate with the one or more memories 230 to receive and/or store information in the one or more memories 230. For example, the processor 210 may receive calibration factors and/or sensor assembly zeros (e.g., phase difference when there is zero flow) from the one or more memories 230. Each of the calibration factors and/or sensor assembly zeros may respectively be associated with the flow meter 5 and/or the sensor assembly 10. The processor 210 may use the calibration factors to process digitized sensor signals received from the one or more signal processors 220.

The one or more signal processors 220 is shown as being comprised of an encoder/decoder (CODEC) 222 and an analog-to-digital converter (ADC) 226. The one or more signal processors 220 may condition analog signals, digitize the conditioned analog signals, and/or provide the digitized signals. The CODEC 222 is configured to receive the sensor signals 165 from the left and right pick-off sensors 170l, 170r. The CODEC 222 is also configured to provide the drive signal 185 to the driver 180. In alternative embodiments, more or fewer signal processors may be employed.

As shown, the sensor signals 165 are provided to the CODEC 222 via a signal conditioner 240. The drive signal 185 is provided to the driver 180 via the signal conditioner 240. Although the signal conditioner 240 is shown as a single block, the signal conditioner 240 may be comprised of signal conditioning components, such as two or more op-amps, filters, such as low pass filters, voltage-to-current amplifiers, or the like. For example, the sensor signals 165 may be amplified by a first amplifier and the drive signal 185 may be amplified by the voltage-to-current amplifier. The amplification can ensure that the magnitude of the sensor signals 165 is approximate the full-scale range of the CODEC 222.

In the embodiment shown, the one or more memories 230 is comprised of a read-only memory (ROM) 232, random access memory (RAM) 234, and a ferroelectric random-access memory (FRAM) 236. However, in alternative embodiments, the one or more memories 230 may be comprised of more or fewer memories. Additionally, or alternatively, the one or more memories 230 may be comprised of different types of memory (e.g., volatile, non-volatile, etc.). For example, a different type of non-volatile memory, such as, for example, erasable programmable read only memory (EPROM), or the like, may be employed instead of the FRAM 236. The one or more memories 230 may be a storage configured to store process data, such as drive or sensor signals, mass flow rate or density measurements, etc.

A mass flow rate measurement (n) can be generated according to the equation:

$$\dot{m} = FCF[\Delta t - \Delta t_0] \quad [1]$$

The Δt term comprises an operationally-derived (i.e., measured) time delay value comprising the time delay existing between the pickoff sensor signals, such as where the time delay is due to Coriolis effects related to mass flow rate through the vibratory flowmeter 5. The measured Δt term ultimately determines the mass flow rate of the flow material as it flows through the vibratory flowmeter 5. The $\Delta t_0$ term comprises a time delay/phase difference at zero flow calibration constant. The $\Delta t_0$ term is typically determined at the factory and programmed into the vibratory flowmeter 5. The time delay/phase difference at zero flow $\Delta t_0$ term will not change, even where flow conditions are changing. A mass flow rate of flow material flowing through the flow meter is determined by multiplying a measured time delay (or phase difference/frequency) by the flow calibration factor FCF. The flow calibration factor FCF is proportional to a physical stiffness of the flow meter.

As to density, a resonance frequency at which each conduit 130, 130' will vibrate may be a function of the square root of a spring constant of the conduit 130, 130' divided by the total mass of the conduit 130, 130' having a material. The total mass of the conduit 130, 130' having the material may be a mass of the conduit 130, 130' plus a mass of a material inside the conduit 130, 130'. The mass of the material in the conduit 130, 130' is directly proportional to the density of the material. Therefore, the density of this material may be proportional to the square of a period at which the conduit 130, 130' containing the material oscillates multiplied by the spring constant of the conduit 130, 130'. Hence, by determining the period at which the conduit 130, 130' oscillates and by appropriately scaling the result, an accurate measure of the density of the material contained by the conduit 130, 130' can be obtained. The meter electronics 20 can determine the period or resonance frequency using the sensor signals 165 and/or the drive signal 185. The conduits 130, 130' may oscillate with more than one vibration mode.

Vibration Modes

Figures 3A, 3B:
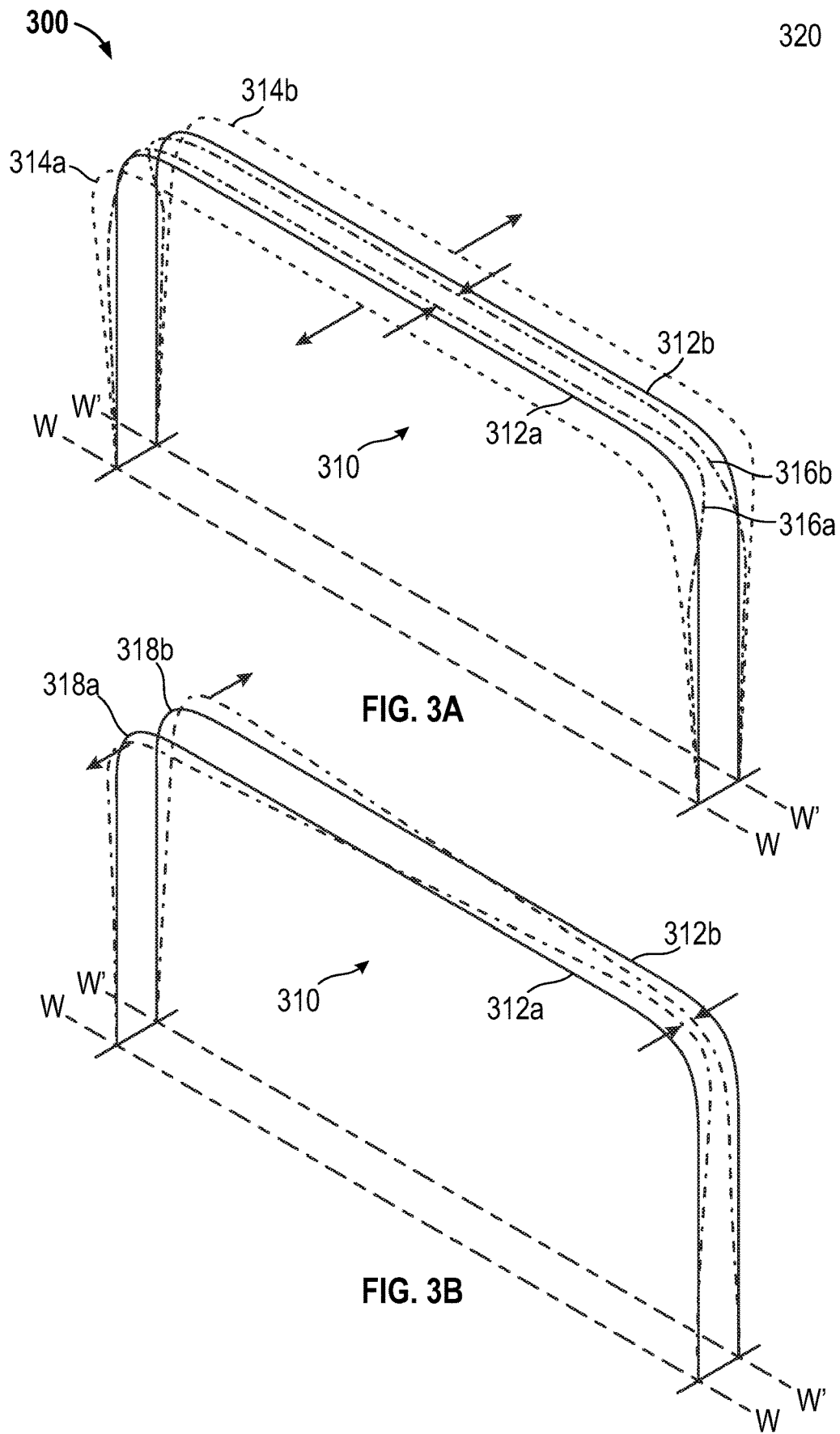
FIGS. 3A and 3B show wireline diagrams of conduits to illustrate vibration modes of the conduits, such as the conduits 130, 130' described above.

FIGS. 3A and 3B show wireline diagrams of conduits to illustrate vibration modes of the conduits, such as the conduits 130, 130' described above. As shown in FIGS. 3A and 3B, the conduits are depicted by wirelines 310. The wirelines 310 have a U-shape to reflect U-shaped conduits, which may be comprised of a left conduit and a right conduit. As shown in FIGS. 3A and 3B, the wirelines 310 include a left at-rest wireline 312a and a right at-rest wireline 312b. Also shown in FIGS. 3A and 3B are bend axes W-W, W'-W', which is collocated with a vibration node of the wirelines 310. In FIG. 3A, the wirelines 310 also include a left first order bend mode wireline 314a and a right first order bend mode wireline 314b. Also shown are a left second order bend mode wireline 316a and a right second order bend mode wireline 316b. In FIG. 3B, the wirelines 310 include a left first order twist mode 318a and a right first order twist mode 318b.

The left and right first order bend mode wirelines 314a, 314b are shown by arrows to be 180 degrees out of phase. That is, they move in an opposing manner. This may be beneficial in various ways, such as reducing a vibration of a vibratory meter due to an unbalanced displacement of the conduits. The left and right first order bend mode wirelines 314a, 314b are also shown as having a single node, which is collocated with the bend axes W-W, W'-W'. The left and right second order bend mode wirelines 316a, 316b are also shown by arrows to be 180 degrees out of phase with each other. However, the left and right second order bend mode wirelines 316a, 316b have two vibration nodes, hence the term "second order." A natural frequency of the left and right second order bend mode wirelines 316a, 316b may be higher than a natural frequency the left and right first order bend mode wirelines 314a, 314b. The left first order twist mode 318a and the right first order twist mode 318b are shown as having asymmetric displacement relative to the left and right at-rest wirelines 312a, 312b along their respective lengths. Arrows illustrate that the left and right first order twist modes 318a, 318b are out of phase with each other.

The vibration modes illustrated by the wirelines 310 are shown as being separate but may be superimposed onto the conduits modeled by the wirelines 310. That is, the conduits modeled by the wirelines 310 may have multiple vibration modes. For example, a left conduit of the conduits may have a first order bend mode, a second order bend mode, and a twist mode. Accordingly, the conduits may have a first order out of phase bend mode, a second order out of phase bend mode, and a first order twist mode. The conduits may have additional modes, such as higher order bend modes (e.g., third, fourth, fifth, etc.), in-phase bend modes, and higher order twist modes (e.g., second, third, fourth, etc.).

As the foregoing illustrates, a vibration mode may have a shape, amplitude, and natural frequency. The shape of the vibration modes can be detected by comparing the sensor signals, such as the sensor signals 165, to each other. A phase difference between a sensor signal provided by the left pick-off sensor 170l and a sensor signal provided by the right pick-off sensor signal 170r may indicate a twist mode excitation caused by Coriolis forces due to flow through the vibratory meter as the tubes vibrate in a bending or other mode, and may be proportional to the phase difference between the conduits 130, 130'. The amplitude of the vibration modes may be proportional to an amplitude of the sensor signals 165.

The frequencies of the vibration modes may be determined from the sensor signals 165 and/or the drive signal 185. More specifically, due to each vibration mode having a natural mode frequency, the sensor signals 165 may have components that correspond to the vibration modes of the conduits 130, 130'. Accordingly, filtering may be used to isolate the components to determine a frequency of each component. The frequency of each component corresponds to frequency of a vibration mode. The frequencies of the vibration modes may be referred to individually as a mode frequency. That is, the mode frequency is a natural frequency of a vibration mode, each of which corresponds to a component in the sensor signals 165 and/or the drive signal 185.

The vibration modes may have relationships. For example, a relationship between two vibration modes, herein referred to as a mode relationship, may be based on the phase, amplitude, and frequency of the two vibration modes. In one example, a mode relationship may be a difference in a frequency of the left and right second order bend mode wirelines 316a, 316b and a frequency of the left and right first order bend mode wirelines 314a, 314b. The mode relationship may be quantified as mode difference. For example, the mode relationship may be a difference between a time-period of the left and right second order bend mode wirelines 316a, 316b relative to a time-period of the left and right first order bend mode wirelines 314a, 314b.

Meter Electronics for Detecting an Orientation

Figure 4:
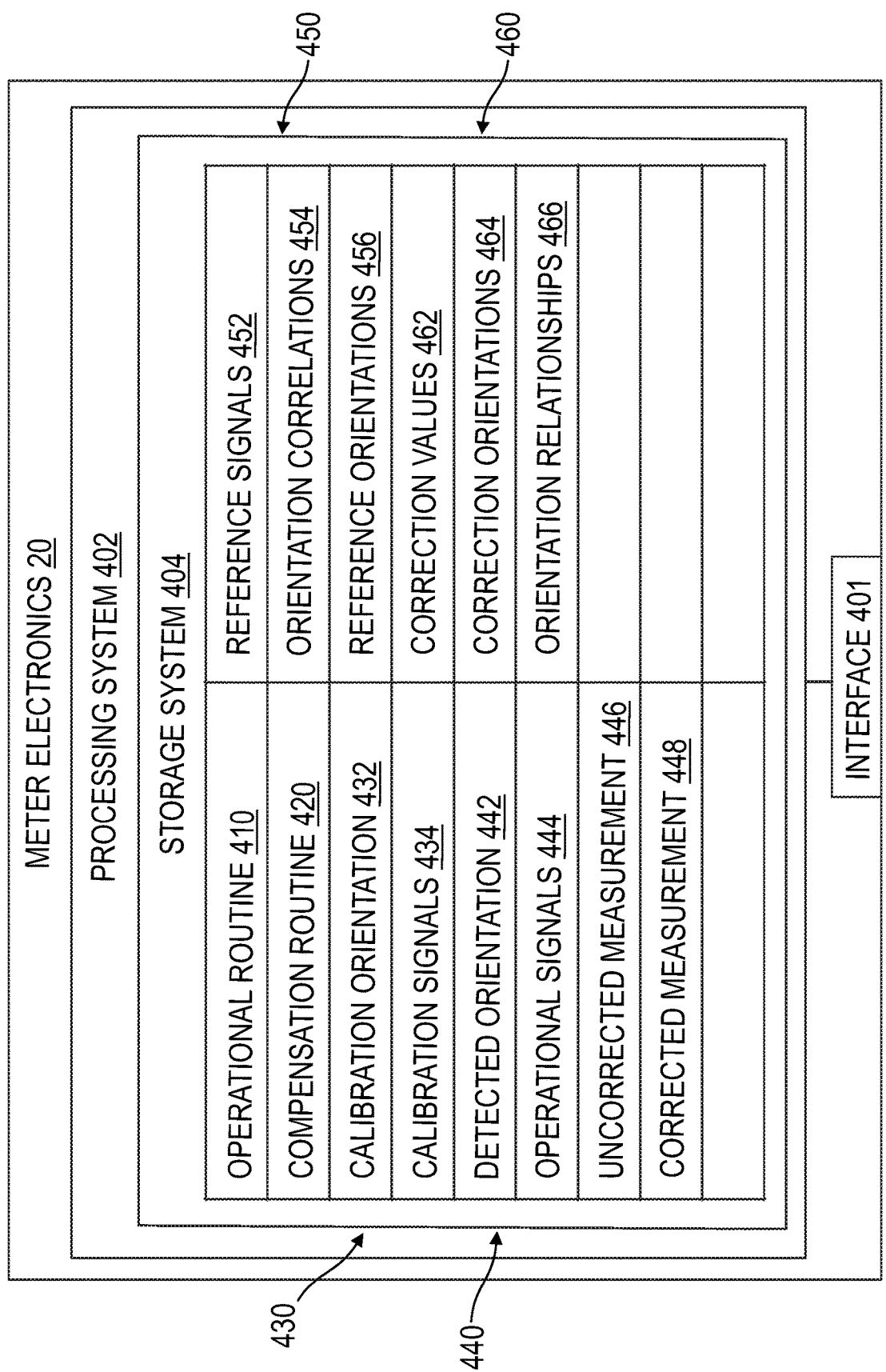
FIG. 4 shows the meter electronics 20 for detecting an orientation of a vibratory meter and compensating a measurement based on the detected orientation.

FIG. 4 shows the meter electronics 20 for detecting an orientation of a vibratory meter and compensating a measurement based on the detected orientation. As shown in FIG. 4, the meter electronics 20 includes an interface 401 and a processing system 402. The meter electronics 20 receives a vibrational response, such as from the sensor assembly 10, for example. The meter electronics 20 processes the vibrational response in order to obtain flow characteristics of the flow material flowing through the sensor assembly 10.

The interface 401 may receive the sensor signals 165 from one of the pick-off sensors 170l, 170r shown in FIGS. 1 and 2. The interface 401 can perform any necessary or desired signal conditioning, such as any manner of formatting, amplification, buffering, etc. Alternatively, some or all of the signal conditioning can be performed in the processing system 402. In addition, the interface 401 can enable communications between the meter electronics 20 and external devices. The interface 401 can be capable of any manner of electronic, optical, or wireless communication. The interface 401 can provide information based on the vibrational response. The interface 401 may be coupled with a digitizer, such as the CODEC 222 shown in FIG. 2, wherein the sensor signal comprises an analog sensor signal. The digitizer samples and digitizes an analog sensor signal and produces a digitized sensor signal.

The processing system 402 conducts operations of the meter electronics 20 and processes flow measurements from the sensor assembly 10. The processing system 402 executes one or more processing routines and thereby processes the flow measurements in order to produce one or more flow characteristics. The processing system 402 is communicatively coupled to the interface 401 and is configured to receive the information from the interface 401.

The processing system 402 can comprise a general-purpose computer, a micro-processing system, a logic circuit, or some other general purpose or customized processing device. Additionally, or alternatively, the processing system 402 can be distributed among multiple processing devices. The processing system 402 can also include any manner of integral or independent electronic storage medium, such as the storage system 404.

The storage system 404 can store flow meter parameters and data, software routines, constant values, and variable values. In one embodiment, the storage system 404 includes routines that are executed by the processing system 402, such as the operational routine 410 and compensation routine 420 of the vibratory meter 5. The storage system can also store statistical values, such as a standard deviation, confidence intervals, or the like.

The compensation routine 420 may compensate a measurement, such as a mass flow rate measurement, for an orientation of a vibratory meter. For example, as will be described in more detail in the following, the compensation routine 420 may detect an orientation of a sensor assembly of the vibratory meter, such as the sensor assembly 10 described above, based on one or more sensor signals provided by the sensor assembly 10. The compensation routine 420 may compensate a measurement, such as a mass flow rate measurement, based on a relationship of the detected orientation of the sensor assembly to a reference orientation of the sensor assembly. The reference orientation may be a calibration orientation.

Accordingly, the storage system 404 may also store calibration information 430. As shown in FIG. 4, the calibration information 430 includes a calibration orientation 432 and calibration signals 434. The calibration orientation 432 may be a value of a list of orientations, such as a tubes-up orientation, a tubes-down orientation, or a flag orientation. The calibration orientation 432 may be detected from the calibration signals 434, input by a user, automatically detected by an accelerometer, or the like. The calibration orientation 432 is associated with the calibration signals 434.

The calibration signals 434 may be measured and stored during a calibration of the vibratory meter 5. The calibration signals 434 may be a time-domain sampling of the sensor signals 165, a frequency spectrum signal showing frequencies of vibration modes, a list of component frequencies where each component frequency is associated with a vibration mode frequency, a list of relationships between the components, any suitable combination of the foregoing, or the like. The calibration signals 434 are associated with the calibration orientation 432.

The storage system 404 can also store operational information 440 that can include data related to an installation of the vibratory meter 5. As shown in FIG. 4, the operational information 440 includes a detected orientation 442, operational signals 444, an uncorrected measurement 446, and a corrected measurement 448. The detected orientation 442 may be a value taken from or pointing to a list of orientations, such as the tubes-up orientation, the tubes-down orientation, or the flag orientation. The detected orientation 442 may be detected from the operational signals 444, input by a user, automatically detected by an accelerometer, or the like. The detected orientation 442 may be an installation orientation. The detected orientation 442 is associated with the operational signals 444.

The operational signals 444 may be measured and stored during a calibration of the vibratory meter 5. The operational signals 444 may be a time-domain sampling of the sensor signals 165 and/or drive signal 185, a frequency spectrum signal showing frequencies of vibration modes, a list of component frequencies where each component frequency is associated with a vibration mode frequency, a list of relationships between the components, any suitable combination of the foregoing, or the like. The operational signals 444 may be associated with the detected orientation 442.

The uncorrected measurement 446 and the corrected measurement 448 may be values of a parameter of a material that is measured by the vibratory meter 5. The parameter may be any suitable parameter, such as density, mass flow rate, or any derived values, such as percentage void fraction, mixture or mixture component densities, etc. The uncorrected measurement 446 may not be corrected for the detected orientation of the vibratory meter 5. For example, if the calibration orientation 432 is the tubes-up orientation and the detected orientation is the tubes-down orientation then a value of the uncorrected measurement 446 may not be equal to a measurement of the vibratory meter 5 in the tubes-up orientation. However, as will be explained in more detail in the following, the uncorrected measurement 446 may be corrected into the corrected measurement 448 by using corrected measurement 448 so as to be equal to the measurement by the vibratory meter 5 in the tubes-up orientation.

The storage system 404 may also store reference information 450 that can include reference related data that can be used to determine an orientation of the vibratory sensor 5. As shown in FIG. 4, the reference information 450 includes reference signals 452 and orientation correlations 454. The reference signals 452 may be sensor signals associated with known orientations. For example, the reference signals 452 may be a list of component frequencies, each of which is associated with a given vibration mode, that is associated with an orientation. This list may be used to determine an orientation signature, such as one of the orientation correlations 454 shown in FIG. 4. The reference orientations 456 may be a list of orientations, for example, that may be used during a calibration that are associated with the reference signals 452. Accordingly, the reference signals 452 may be the same as the calibration signals 434.

The orientation correlations 454 may be a list of mode relationships that are associated with orientations of the vibratory meter 5. For example, the orientation correlations 454 may be a list of mode relationships that are correlated with orientations of the sensor assembly 10. The mode relationships may be quantitative relationships, such as differences and ratios, of two or more vibration parameter values respectively associated with modes, as is explained in the following with respect to FIG. 7, which relies on tube periods and observed density values, although any suitable parameters may be employed.

Still referring to FIG. 4, the storage system 404 may also include correction information 460. The correction information 460 is shown as including correction values 462, correction orientations 464, and orientation relationships 466. The correction values 462 may be associated with orientations of the vibratory meter 5. For example, the correction values 462 may include a list of values each of which is associated with an orientation of the vibratory meter 5, such as the correction orientations 464 shown in FIG. 4. The correction orientations 464 may include a list of orientations, such as a tubes-up orientation, a tube-down orientation, or flag orientation, or the like.

As can be appreciated, the correction values 462 may be associated with the correction orientations 464 depending on relationships between orientations, such as a relationship between the calibration orientation 432 and the detected orientation 442. These and other relationships may be in the orientation relationships 466. For example, if the calibration orientation 432 is a tubes-up orientation and the detected orientation is a tubes-down orientation, then the orientation relationship may be tubes-up to tubes-down relationship. The orientation relationships 466 may relate the tubes-up to tube-down relationship to a correction value in the correction values 462. Accordingly, the uncorrected measurement 446 may be corrected to the corrected measurement 448 using the correction value.

The orientation relationships 466 may also include relationships between two of the correction values 462 and the orientation relationships. For example, a first correction value in the correction values 462 may be associated with the tubes-up to tubes-down relationship and a second correction value may be associated with a tubes-down to tubes-up relationship. A difference between the first and second correction value may be associated with a tubes-down to flag relationship. That is, the calibration orientation 432 may be the tubes-down orientation and the detected orientation 442 may be the flag orientation. Accordingly, the uncorrected measurement 446 may be corrected to the corrected measurement 448 using the difference between the first and second correction value.

As can be appreciated, the calibration orientation 432 may always be in a particular orientation, such as the tubes-down orientation. Accordingly, the correction values 462 may only have three values that are each associated by the orientation relationship 466 with the tubes-up, tube-down, and flag orientations of the corrections orientations 464. However, the orientation relationships 466 may also include relationships between correction values relationships, such as a relationship between two of the correction values, and an orientation relationship.

Figure 5A:
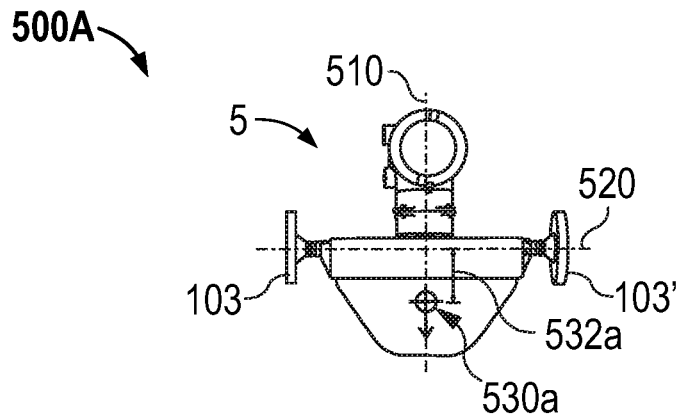
FIGS. 5A-5C show different exemplary orientations of the vibratory meter 5.
Figure 5B:
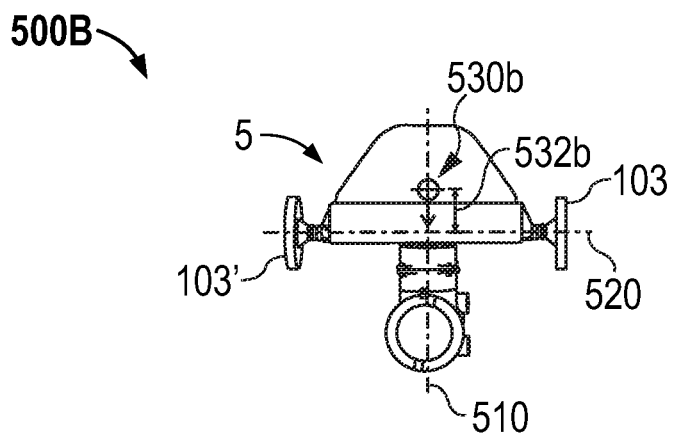
Figure 5C:
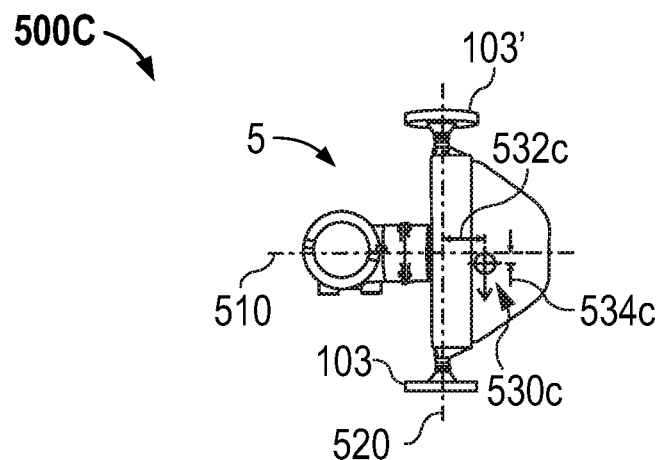

As can also be appreciated, the correction value associated with an indifferent orientation relationship (e.g., tubes-up to tubes-up, tubes-down to tubes-down, flag to flag relationships, etc., see FIGS. 5A-5C) may be null, zero, or the like. For example, if the uncorrected measurement 446 is corrected by adding the correction value, the correction value may be zero for the indifferent orientation relationship. If the uncorrected measurement 446 is corrected by multiplying the correction value, the correction value may be null to indicate that the multiplication operation should not be performed. Accordingly, the corrected measurement 448 may be the same as the uncorrected measurement 446. The correction may need to be made based on a detected orientation of a vibratory meter, which means that the orientations may need to be defined, as is shown in the following with reference to FIGS. 5A-5C.

Exemplary Orientations

FIGS. 5A-5C show different exemplary orientations of the vibratory meter 5. As shown in FIG. 5A, the vibratory meter 5 has a tubes-down orientation 500A and in FIG. 5B the vibratory meter 5 has a tube-up orientation 500B. The vibratory meter 5 is shown as having a flag orientation 500C in FIG. 5C. In FIGS. 5A-5C, the vibratory meter 5 includes a transverse axis 510 that may be defined as being transversal to a material flow direction. The vibratory meter 5 also includes a longitudinal axis 520. The material flow direction may be viewed as collinear with the longitudinal axis at the flange 103 to flange 103' even though the material may flow in other directions between the flanges 103, 103'.

Also shown in FIGS. 5A-5C are a tubes-down center-of-gravity 530a, a tubes-up center-of-gravity 530b, and a flag center-of-gravity 530c. A center-of-gravity for a vibratory meter may be a center of mass of the fluid and conduit material between the brackets, although any suitable center of mass may be employed. As shown in FIGS. 5A-5C, a tubes-down transversal length 532a corresponds to the tubes-down center-of-gravity 530a, a tubes-up transversal length 532b corresponds to the tubes-up center-of-gravity 530b, and a flag transversal length 532c corresponds to the flag center-of-gravity 530c. A flag longitudinal length 534c also corresponds to the flag center-of-gravity 530c. As can be appreciated from FIGS. 5A-5C, the location of the center-of-gravity relative to the location of the brackets differs depending on the orientation of the vibratory meter 5. More specifically, head pressure can cause density of a material to be greater when the vibratory meter 5 is in the tubes-down orientation 500A relative to the tubes-up orientation 500B. This can cause a measurement of the material in the vibratory meter 5 to be inaccurate. Accordingly, by detecting an orientation of the vibratory meter, the measurement may be corrected.

Detecting an Orientation

As will be explained in more detail in the following, an orientation of a vibratory meter may be detected by measuring sensor signal parameters of two or more vibration modes. For example, time-periods of conduits in the vibratory meter may be measured for a first order bend mode and a second order bend mode. These two time periods may be used to respectively determine observed density values: a first order observed density value and a second order observed density value. A difference in between the first and second observed density value may be compared to previously determined correlations to orientations of the vibratory meters to detect the orientation of the vibratory meter. Other sensor signal parameters may be used.

Figure 6:
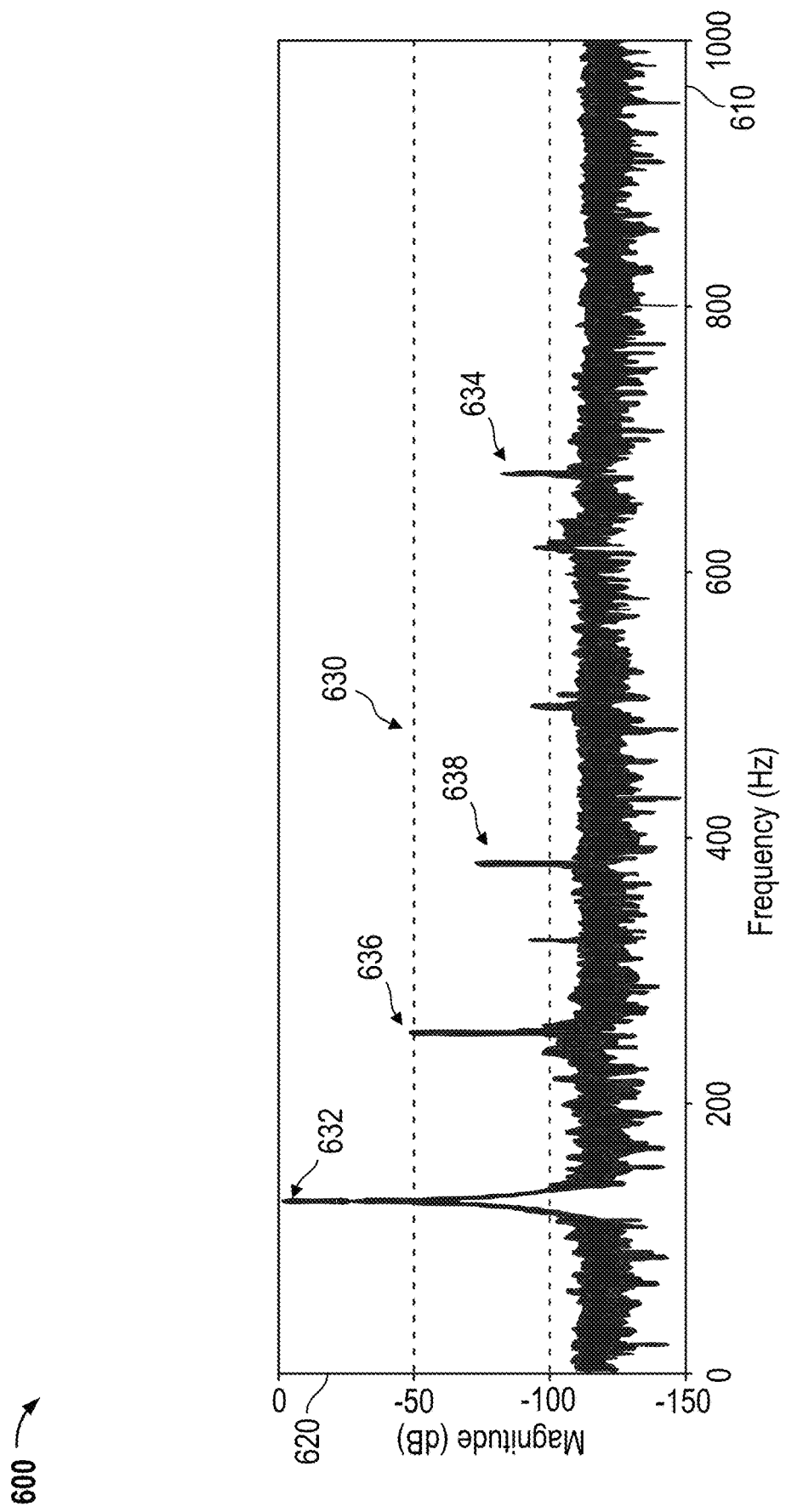
FIG. 6 shows a frequency spectrum graph 600 of a vibratory meter.

FIG. 6 shows a frequency spectrum graph 600 of a vibratory meter. As shown in FIG. 6, the frequency spectrum graph 600 includes a frequency axis 610 in units of hertz (Hz) and a magnitude axis 620 in decibels (dB). As can be seen, the frequency axis 610 ranges from 0 to 1000 Hz and the magnitude axis 620 ranges from –150 to 0 dB, although any suitable units and numerical ranges may be employed. The frequency spectrum graph 600 also includes a spectrum plot 630. The spectrum plot 630 is shown as having a first order drive peak 632 and a second order drive peak 634. Also shown is a first order twist mode peak 636 and an in-phase bending mode peak 638. The first order drive peak 632 is at about 127 Hz and the second order drive peak 634 is at about 675 Hz.

The spectrum plot 630 may be generated by sweeping from 0 Hz to 1000 Hz and measuring the resulting vibration. By way of example, with reference to the vibratory meter 5 described above, the drive signal 185 may be a sinusoidal signal provided to the conduits 130, 130' over a frequency of 0 Hz to 1000 Hz at a fixed amplitude. An amplitude of the left and right sensor signals 165l, 165r may be measured as the drive signal 185 is swept from 0 to 1000 Hz. As can be appreciated, the first order drive peak 632 is centered about a natural frequency of the vibratory meter 5. However, as can be seen in the spectrum plot 630, both the first and second order drive peak 632, 634 are above a noise floor of the spectrum plot 630 and may therefore be filtered and measured.

The first order drive peak 632 may correspond to a first order bend mode of the conduits 130, 130'. Similarly, the second order drive peak 634 may correspond to a second order bend mode of the conduits 130, 130'. Accordingly, during operation, the drive signal 185 may have two sinusoidal components that are respectively centered at about 127 Hz and 675 Hz. The sensor signals 165l, 165r may be filtered by two band pass filters respectively centered at about 127 Hz and 675 Hz. The CODEC 222 may track the first and second order drive peaks 632, 634 as their frequencies vary due to material flow through the conduits 130, 130'.

Accordingly, sensor signal parameters of each vibration mode may be measured and may be correlated to the properties of the material in the conduits 130, 130'. For example, a time-period and a frequency of the drive signal 185 and/or sensor signals 165l, 165r may vary according to a density of the material in the conduits 130, 130'. Similarly, an amplitude of the drive signal 185 and/or sensor signals 165l, 165r may vary. As can be appreciated, other parameters of the material may be determined, such as, for example viscosity, flow rate, composition, or the like.

As can be appreciated, these sensor signal parameters may correspond to modes of vibration. For example, the first order bend mode corresponding to the first order drive peak 632 may have a frequency that is lower than a frequency of the second order bend mode corresponding to the second order drive peak 634. Accordingly, the first order bend mode may be used to generate a first order density value and the second order bend mode may be used to generate a second order density value. As can be appreciated, these density values should be equal to each other, but may not be equal to each other due to an orientation of the vibratory meter. Accordingly, the difference in the density values, or other measured values or the sensor signal parameters, may be used to detect an orientation of the vibratory meter, as the following discussion illustrates.

Figure 7:
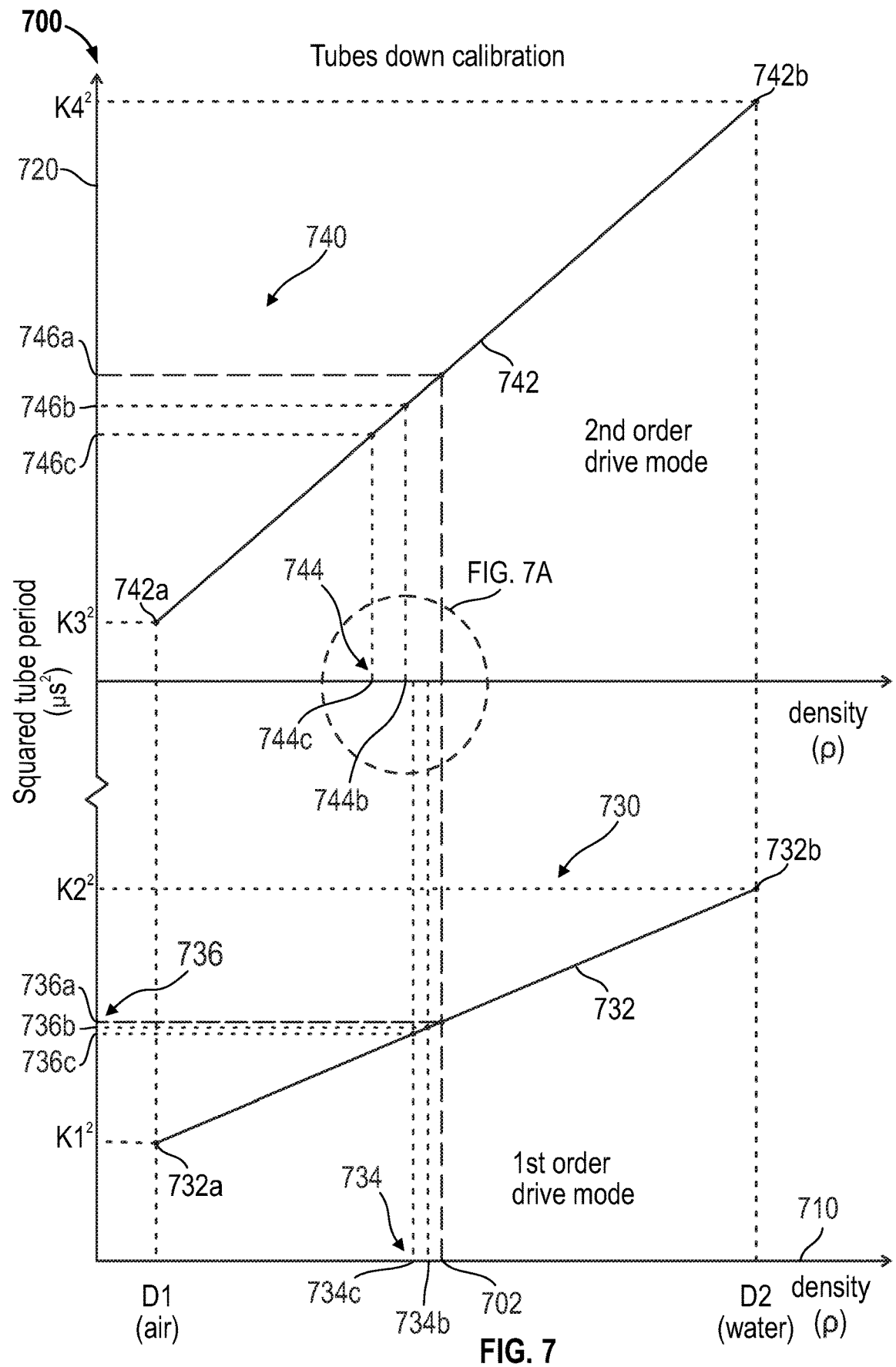
FIG. 7 shows a calibration graph 700 illustrating a detection of an orientation of a vibratory meter.

FIG. 7 shows a calibration graph 700 illustrating a detection of an orientation of a vibratory meter. As shown in FIG. 7, the calibration graph 700 includes a density axis 710 in units of grams-per-centimeter cubed (g/cm$^3$) and a squared time-period axis 720 in units of micro-seconds squared ($\mu s^2$). As indicated, the calibration graph 700 is of the vibratory meter in a tubes-down orientation. The calibration graph 700 includes a calibrated density value 702. In other words, if an unknown material having a density value that is the same as the calibrated density value 702 is measured in the tube-down orientation (which is the same as the calibration orientation), then the observed density value will equal the calibrated density value 702.

As can be seen, the calibration graph 700 includes a first order graph 730 and second order graph 740. The first and second order graphs 730, 740 were respectively obtained by measuring tube periods of first and second order bend modes during a calibration. More specifically, the first and second order graphs 730, 740 were obtained by measuring the tube periods when the vibratory meter was alternatively filled with water and air. Air has a density of about 0.001 g/cm$^3$ and water has a density of about 0.9982 g/cm$^3$, which are respectively denoted as D1 and D2 in the calibration graph 700.

As shown in FIG. 7, the first order graph 730 includes a first order calibration plot 732 and the second order graph 740 includes a second order calibration plot 742. The first and second order calibration plots 732, 742 have respectively first order air coordinate 732a and a first order water coordinate 732b, and a second order air coordinate 742a and a second order water coordinate 742b. The first order air coordinate 732a and a second order air coordinate 742a are determined by measuring respectively the tube period of the first order bend mode and the second order bend mode, respectively, while air is in the conduits of the vibratory flow meter. Similarly, the first order water coordinate 732b and the second order water coordinate 742b are determined by measuring the tube period of the first order bend mode and the tube period of the second order bend mode, respectively, while water is in the conduits of the vibratory flow meter.

In most vibratory meters there is a linear relationship between a density of a material and a square of the tube period of the conduits containing the material. Accordingly, the first order air coordinate 732a and the first order water coordinate 732b are respectively comprised of a squared first order air tube period $K1^2$ and the air density value D1, and a squared first order water tube period $K2^2$ and the water density value D2. Similarly, the second order air coordinate 742a and a second order water coordinate 742b are comprised of a squared second order air tube period $K3^2$ and the air density value D1, and a squared second order water tube period $K4^2$ and the water density value D2. The linear relationship between the density of the material and the square of the tube period is relied on to generate the first and second order calibration plots 732, 742 between their respective first order air coordinate 732a and first order water coordinate 732b, and second order air coordinate 742a and second order water coordinate 742b. For other vibratory meters, which exhibit a non-linear relationship, calibration plots can be defined as polynomial or other curve fits to two or more coordinates determined in a similar fashion at other densities with other fluid materials or fluid temperatures.

The first and second order calibration plots 732, 742 may be used to determine a density of an unknown material. For example, where the vibratory meter is installed in a tubes-down orientation and the material has a density that is equal to the calibrated density value 702, then the observed density value may equal the calibrated density value 702 determined from the first and second order calibration plots 732, 742. That is, first and second order calibration plots 732, 742 will generate the same calibrated density value 702. Associated with the calibrated density value 702 are a squared first order calibrated tube period 736*a* that is an ordinate on the first order calibration plot 732 and a squared second order calibrated tube period 746*a* that is an ordinate on the second order calibration plot 742.

However, the vibratory meter may be installed in an orientation that is not the tube-down orientation used during calibration. When the vibratory meter is installed in an orientation that is not the same as the calibration orientation, the first and second order calibration plots 732, 742 may not generate the calibrated density value 702. In addition, the first and second order calibration plots 732, 742 may respectively generate unequal first and second order density values 734, 744. This difference between the observed density values may be used to determine the orientation of the vibratory meter during measurement, as the following explains.

When the vibratory meter is installed in a flag orientation, the first and second order calibration plots 732, 742 may respectively generate a first order flag density value 734*b* and a second order flag density value 744*b* that respectively correspond to a square first order flag tube period 736*b* and a square second order flag tube period 746*b*. When the vibratory meter is installed in a tubes-up orientation, the first and second order calibration plots 732, 742 may respectively generate a first order tubes-up density value 734*c* and a second order tubes-up density value 744*c* that respectively correspond to a square first order tubes-up tube period 736*c* and a square second order tubes-up tube period 746*c*. As can be seen, the first and second order flag density values 734*b*, 744*b* are not equal to each other. Also, the first and second order tubes-up density values 734*c*, 744*c* are not equal to each other. The differences between the first and second order density values 734, 744 are discussed in more detail in the following with reference to FIG. 7A.

Figure 7A:
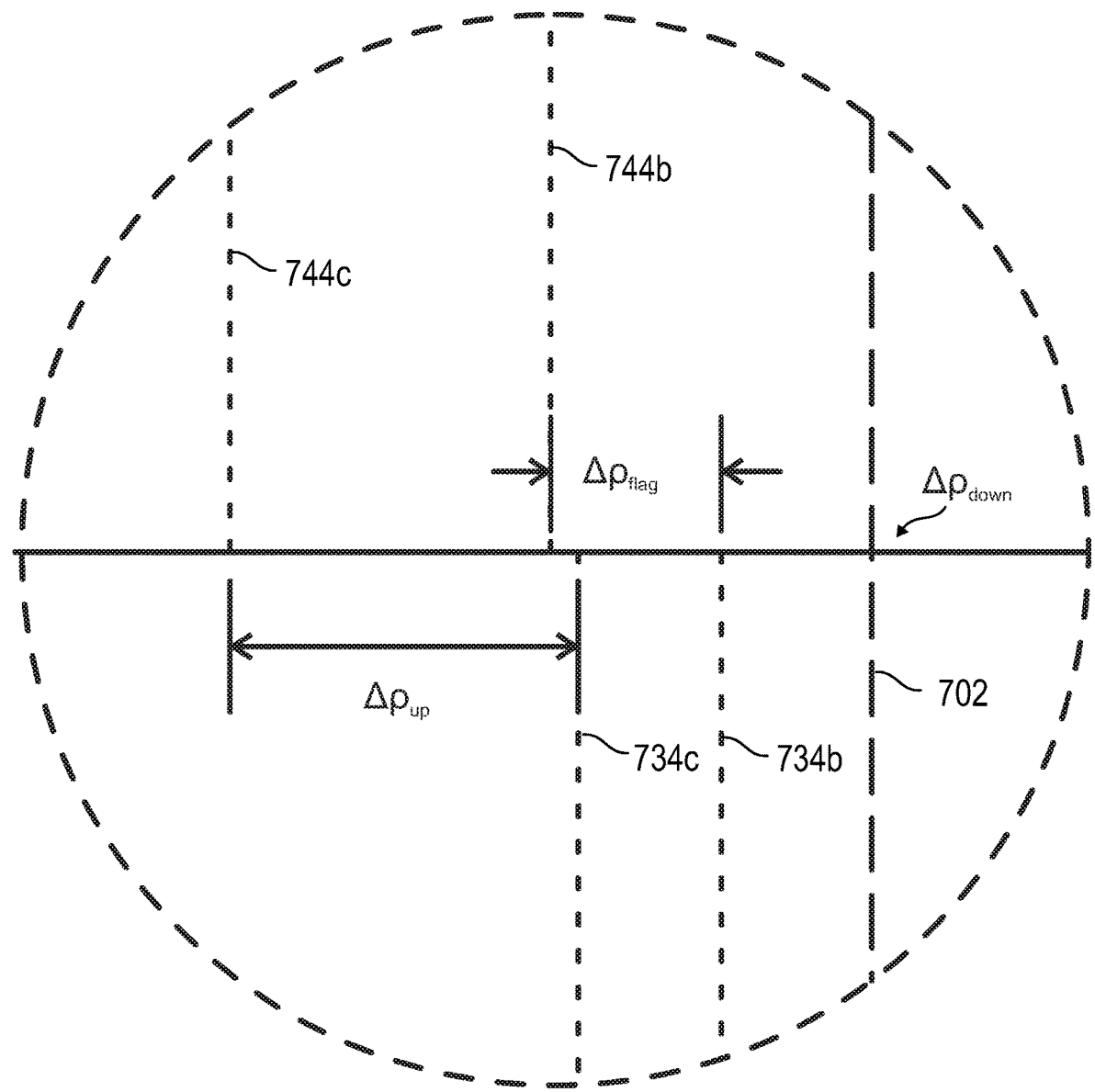
FIG. 7A shows a detailed view of a portion of the calibration graph 700.

FIG. 7A shows a detailed view of a portion of the calibration graph 700. As shown in FIG. 7A, the density axis of the second order graph 740 is intersected by lines representing the first order flag density value 734*b*, the first order tubes-up density value 734*c*, the second order flag density value 744*b*, and the second order tubes-up density value 744*c*. A tubes-down density difference $\Delta\rho_{down}$ is equal to zero, as is expected because the vibratory meter is calibrated in the tubes-down orientation. As can be appreciated, a flag density difference $\Delta\rho_{flag}$ is not equal to a tubes-up density difference $\Delta\rho_{flag}$. As can also be appreciated, the tubes-up density difference $\Delta\rho_{flag}$ is about double the size of the flag density difference $\Delta\rho_{flag}$. Accordingly, the orientation of the vibratory meter may be detected.

For example, the meter electronics 20 may store orientation correlations 454 that correlate the tubes-up density difference $\Delta\rho_{up}$ with a tubes-up orientation and the flag density difference $\Delta\rho_{flag}$ with the flag orientation. The correlations may be indexed by, for example, operating frequency, tube period, etc. That is, a value of the tubes-up density difference $\Delta\rho_{up}$ or the flag density difference $\Delta\rho_{flag}$ may differ in proportion to the operating frequency of the vibratory meter 5. The orientation correlations 454 may be in any suitable form, such as percentages, ratios, or the like that are relative to or operate on other parameters, such the operating frequency of the vibratory meter 5, observed density value, etc. Values other than density may be used in the orientation correlations 454. For example, the orientation correlations 454 may correlate time periods, or squared time periods, or differences thereof, of the conduits 130 in the vibratory meter 5 with the orientations of the vibratory meter 5. These and other correlations may be used to determine the orientation of a vibratory meter, such as the vibratory meter 5 described above, which may then be used to correct a measurement.

The correlations may be generalized to sensor signal parameters or other material parameters. For example, a time-period of a vibration may be denoted as $t_{MO}$ where "MO" denote the mode (m) and the order (O). The modes can be denoted by β and ζ respectively as bend and twist mode. The order may be denoted by 1, 2, 3. So a first order bend mode and a first order twist mode can be respectively denoted as β1 and ζ1. A first order bend mode and a second order bend mode may be denoted as β1 and β2. Accordingly, a difference may be defined as $t_{\beta1}-t_{\beta2}$. This can be shortened to $\Delta_{\beta1\beta2}$. This nomenclature may be used for material parameters, such as, for example, density. A density difference between densities determined using the first order bend mode and the second order bend mode may defined by $\rho_{\beta1}-\rho_{\beta2}$, which can be shortened to $\Delta\rho_{\beta1\beta2}$.

Compensating a Measurement Based on an Orientation

The below table illustrates how a measurement may be compensating based on an orientation of a vibratory meter. In the below table, the columns and rows are headed by the three orientations of tubes-down, tubes-up, and flag, although any suitable orientations and/or descriptions of the orientations may be employed. The table below also includes correction values designated by letters 'A' and 'B' that are in percentage of an uncorrected measurement. As shown, the correction values A, B are associated with a change from a calibration orientation to a current orientation. That is, A is a correction value (in % of reading) from tubes-down calibration to flag operation. B is a correction value (in % of reading) from tubes-down calibration to tubes-up operation.

The tubes-down calibration to a tubes-up operation may be a relationship between a reference orientation and a detected orientation of the vibratory meter. That is, the reference orientation may be the calibration orientation and the detected orientation may be the current orientation. Additionally, with reference to above FIG. 4, the calibration orientation may be a value in the reference orientations 456, the current orientation may be a value in the correction orientations 464, and the relationship between the reference orientation and the detected orientation may be a value in the orientation relationships 466.

| Orientation during most recent Calibration | Current Orientation | | |
|---|---|---|---|
| | Tubes-Down | Flag | Tubes-Up |
| Tubes-Down | Null (no correction) | A | B |
| Flag | −A | Null (no correction) | B − A |
| Tubes-Up | −B | A − B | Null (no correction) |

Accordingly, when the current orientation is the same as the calibration orientation then the above table returns a null value indicating that the uncorrected measurement may not be corrected. Therefore, the uncorrected measurement may be provided as an accurate measurement. When the calibration orientation is tubes-down and the current orientation is tubes-up, then the correction value may be B. The uncorrected measurement may be corrected with B by, for example, adding the uncorrected measurement multiplied by B to the uncorrected measurement. As can also be seen in the above table, the tubes-up calibration orientation to flag orientation has a correction value of A-B. That is, the uncorrected measurement may be corrected by adding the uncorrected measurement multiplied by the difference of A and B to the uncorrected measurement.

Method

Figure 8:
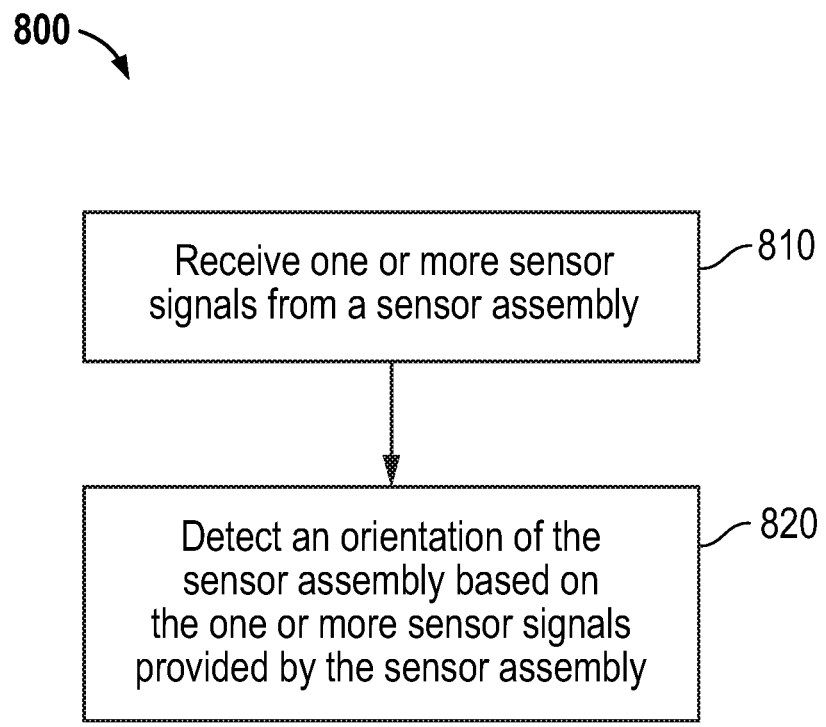
FIG. 8 shows a method 800 of detecting an orientation of a vibratory meter.

FIG. 8 shows a method 800 of detecting an orientation of a vibratory meter. As shown in FIG. 8, the method 800, in step 810, receives one or more sensor signals from a sensor assembly. The sensor assembly may be the same as the sensor assembly 10 described above, although any suitable sensor assembly may be employed. The one or more sensor signals may be received by, for example, the interface 401 described above. The interface 401 and/or processing system 402 may condition, sample, digitize, compress and/or expand, decimate, etc., the one or more received sensor signals. In step 820, the method 800 detects an orientation of the sensor assembly based on the one or more sensor signals provided by the sensor assembly. The above described processing system 402 may detect the orientation.

The method 800, in step 820, may detect the orientation based on a time-period of one or more vibration modes of a sensor assembly as observed in a sensor signal in the one or more sensor signals provided by the sensor assembly. For example, the orientation may be detected based on the time-period of one or more vibration modes comprises detecting the orientation based on density values determined from at least two of the one or more vibration modes. In one example that is described above with reference to FIGS. 7 and 7A, the method 800 may compare the first order flag density value 734b and the second order flag density value 744b to determine that the sensor assembly is in a flag orientation. This comparison may be a difference between the two density values or may be made relative to the calibrated density value 702. For example, a difference between the first order flag density value 734b and the calibrated density value 702 may be compared to the difference between the second order flag density values 744b and the calibrated density value 702. Other ways, such as comparing time periods, frequencies, or the like, may be employed to detect the orientation. Additionally, more than two vibration modes may be employed.

The method 800 may also compensate a measurement based on the detected orientation of the sensor assembly. For example, the measurement may be compensated based on a relationship of the detected orientation of the sensor assembly to a reference orientation of the sensor assembly. Referring to the example of the above table, the relationship of the detected orientation and the reference orientation may be the relationship of the current orientation, such as a flag orientation and the calibration orientation, such as a tubes-down orientation. This relationship determines that the correction value is A. This value may be applied to correct a measurement of, for example, a density or a volume flow rate measurement of a material in the sensor assembly. As can be seen in the above table, the current orientation and/or calibration orientation of the sensor assembly may be a tubes-down orientation, tubes-up orientation, and flag orientation. However, other orientations may be employed.

The vibratory meter 5, meter electronics 20, and method 800 described above may detect the orientation of the sensor assembly 10 and correct a measurement. As a result, the corrected measurement may be accurate. The orientation may be detected based on the sensor signals provided by the sensor assembly 10 and therefore does not require additional hardware. Accordingly, the orientation may be detected in any vibratory meter that can be configured to, for example, vibrate the sensor assembly 10 in two or more vibration modes. This may include vibratory meters installed in the field. The orientation may be detected by any suitable parameters of, or determined from, the sensor signals, such as using density values determined from two or more vibration modes and can therefore be configured as needed to reduce computing resources while preserving a desired amount of accuracy. Although any suitable parameter, such as tube-period or frequency, may be employed, the density values of the first order bend mode and the second order bend mode may be more accurate due to, for example, temperature correction that may be employed to determine the density values.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other meter electronics, vibratory meters, and methods for detecting and correcting for an orientation of a vibratory meter and not just to the embodiments described above and shown in the accompanying figures. Accordingly, the scope of the embodiments described above should be determined from the following claims.

I claim:

1. A meter electronics (20) for detecting an orientation and compensating a measurement based on the detected orientation, the meter electronics (20) comprising:
    an interface (401) configured to communicatively couple to a sensor assembly (10) containing a material; and
    a processing system (402) configured to detect an orientation of the sensor assembly (10) based on a mode relationship between two or more vibration modes as observed in one or more sensor signals provided by the sensor assembly (10).

2. The meter electronics (20) of claim 1, wherein the processing system (402) being configured to detect the orientation of the sensor assembly (10) containing the material based on the mode relationship between two or more vibration modes as observed in the one or more sensor signals comprises the processing system (402) being configured to detect the orientation based on a time-period of at least one of the two or more vibration modes of the sensor assembly (10) as observed in a sensor signal in the one or more sensor signals provided by the sensor assembly (10).

3. The meter electronics (20) of claim 2, wherein the meter electronics (20) being configured to detect the orientation based on the time-period of at least one of the two or more vibration modes comprises the meter electronics (20) being configured to detect the orientation based on density values determined from at least two of the two or more vibration modes.

4. The meter electronics (20) of claim 1, wherein the processing system (402) is further configured to compensate a measurement based on the detected orientation of the sensor assembly (10).

5. The meter electronics (20) of claim 4, wherein the processing system (402) being further configured to compensate the measurement based on the detected orientation of the sensor assembly (10) comprises the processing system (402) being further configured to compensate the measurement based on a relationship of the detected orientation of the sensor assembly (10) to a reference orientation of the sensor assembly (10).

6. The meter electronics (20) of claim 5, wherein the reference orientation is a calibration orientation.

7. The meter electronics (20) of claim 1, wherein the detected orientation of the sensor assembly (10) is one of a tubes-down orientation (500A), a tubes-up orientation (500B), and a flag orientation (500C).

8. A vibratory meter (5) for detecting an orientation and compensating a measurement based on the detected orientation, the vibratory meter (5) comprising:
a sensor assembly (10); and
a meter electronics (20) communicatively coupled to the sensor assembly (10), the meter electronics (20) being configured to:
detect an orientation of the sensor assembly (10) based on a mode relationship between two or more vibration modes as observed in one or more sensor signals provided by the sensor assembly (10).

9. The vibratory meter (5) of claim 8, wherein the meter electronics (20) being configured to detect the orientation of the sensor assembly (10) based on the mode relationship between two or more vibration modes as observed in the one or more sensor signals comprises the meter electronics (20) being configured to detect the orientation based on a time-period of the one mode relationship between two or more vibration modes of the sensor assembly (10) as observed in a sensor signal in the one or more sensor signals provided by the sensor assembly (10).

10. The vibratory meter (5) of claim 9, wherein the meter electronics (20) being configured to detect the orientation based on the time-period of at least one of the two or more vibration modes comprises the meter electronics (20) being configured to detect the orientation based on density values determined from at least two of the one or more vibration modes.

11. The vibratory meter (5) of claim 8, wherein the meter electronics (20) is further configured to compensate a measurement based on the detected orientation of the sensor assembly (10).

12. The vibratory meter (5) of claim 11, wherein the meter electronics (20) being further configured to compensate the measurement based on the detected orientation of the sensor assembly (10) comprises the meter electronics (20) being further configured to compensate the measurement based on a relationship of the detected orientation of the sensor assembly (10) to a reference orientation of the sensor assembly (10).

13. The vibratory meter (5) of claim 12, wherein the reference orientation is a calibration orientation.

14. The vibratory meter (5) of claim 8, wherein the detected orientation of the sensor assembly (10) is one of a tubes-down orientation (500A), a tubes-up orientation (500B), and a flag orientation (500C).

15. A method for detecting an orientation of a vibratory meter and compensating a measurement based on the detected orientation, the method comprising:
receiving two or more sensor signals from a sensor assembly; and
detecting an orientation of the sensor assembly based on a mode relationship between the two or more vibration modes as observed in the one or more sensor signals provided by the sensor assembly.

16. The method of claim 15, wherein detecting the orientation of the sensor assembly based on at least one of the two or more vibration modes as observed in the one or more sensor signals comprises detecting the orientation based on a time-period of at least one of the two or more vibration modes of a sensor assembly as observed in a sensor signal in the one or more sensor signals provided by the sensor assembly.

17. The method of claim 16, wherein detecting the orientation based on the time-period of at least one of the two or more vibration modes comprises detecting the orientation based on density values determined from at least two of the two or more vibration modes.

18. The method of claim 15, further comprising compensating a measurement based on the detected orientation of the sensor assembly.

19. The method of claim 18, wherein compensating the measurement based on the detected orientation of the sensor assembly comprises compensating the measurement based on a relationship of the detected orientation of the sensor assembly to a reference orientation of the sensor assembly.

20. The method of claim 19, wherein the reference orientation is a calibration orientation.

21. The method of claim 15, wherein the detected orientation of the sensor assembly is one of a tubes-down orientation, a tubes-up orientation, and a flag orientation.

* * * * *